United States Patent [19]
Kanai

[11] Patent Number: 6,103,422
[45] Date of Patent: Aug. 15, 2000

[54] CATHODE ACTIVE MATERIAL AND NONAQUEOUS SECONDARY BATTERY CONTAINING THE SAME

[75] Inventor: Hiroyuki Kanai, Wakayama, Japan

[73] Assignee: Kao Corporation, Tokyo, Japan

[21] Appl. No.: 09/091,421

[22] PCT Filed: Dec. 20, 1996

[86] PCT No.: PCT/JP96/03738

§ 371 Date: Jun. 24, 1998

§ 102(e) Date: Jun. 24, 1998

[87] PCT Pub. No.: WO97/23918

PCT Pub. Date: Jul. 3, 1997

[30] Foreign Application Priority Data

Dec. 26, 1995 [JP] Japan .................................. 7-338438

[51] Int. Cl.[7] ............................ H01M 4/50; C01G 45/12
[52] U.S. Cl. ........................................ 429/224; 423/599
[58] Field of Search ............................. 429/224; 423/599

[56] References Cited

U.S. PATENT DOCUMENTS

| | | | |
|---|---|---|---|
| 5,084,366 | 1/1992 | Toyoguchi | 429/224 |
| 5,567,401 | 10/1996 | Doddapaneni | 423/179.5 |
| 5,705,291 | 1/1998 | Amatucci | 429/137 |
| 5,733,685 | 3/1998 | Wang | 429/224 |
| 5,759,717 | 6/1998 | Amine | 429/218 |

FOREIGN PATENT DOCUMENTS

| | | |
|---|---|---|
| 0 511 632 | 11/1992 | European Pat. Off. . |
| 0 672 622 | 9/1995 | European Pat. Off. . |
| 4-87152 | 3/1992 | Japan . |
| 8-162115 | 6/1996 | Japan . |
| 09035712 | 2/1997 | Japan . |

OTHER PUBLICATIONS

D. Guyomard, et al., Journal of the Electrochemical Society, vol. 139, No. 4, pp. 937–948, "Li Metal–Free Rechargeable $LiMn_2O_4$/Carbon Cells: Their Understanding and Optimization", Apr., 1992.

R.J. Gummow, A. De Kock et al. Solid State Ionics, vol. 69, pp. 59–67, 1994, Improved Capacity Retention In Rechargeable 4 V Lithium/Lithium–Manganese Oxide (Spinel) Cells, No Month.

J. Electrochem. Soc., vol. 139, No. 4, Apr. 1992, D. Guyomard, et al. pp. 937–948, Li Metal–Free Rechargeable $Limn_2O_4$/Carbon Cells: Their Understanding and Optimization.

*Primary Examiner*—Maria Nuzzolillo
*Assistant Examiner*—Tracy Dove
*Attorney, Agent, or Firm*—Oblon, Spivak, McClelland, Maier & Neustadt, P.C.

[57] ABSTRACT

The powdery cathode active material of the present invention for use in a nonaqueous electrolyte secondary battery comprises as the active ingredient a lithium manganese composite oxide and at least one nonmanganese metal element selected from the group consisting of aluminum, magnesium, vanadium, chromium, iron, cobalt, nickel, and zinc, provided that the nonmanganese metal element exists in the surface portions of fine particles constituting the powdery cathode active material.

A nonaqueous electrolyte secondary battery comprising such a cathode active material, an anode active material and a nonaqueous electrolytic solution containing a lithium salt has a large charge-and-discharge capacity and a stable charge-and-discharge cycle durability, and can be prepared inexpensively.

12 Claims, No Drawings

CATHODE ACTIVE MATERIAL AND NONAQUEOUS SECONDARY BATTERY CONTAINING THE SAME

BACKGROUND OF THE INVENTION

1. Technical Field to which the Invention Pertains

The present invention relates to a cathode active material for use in a nonaqueous electrolyte secondary battery, a process for preparing the same, and a nonaqueous electrolyte secondary battery containing the cathode active material. More particularly the present invention relates to an improvement in a cathode active material for use in a nonaqueous electrolyte secondary battery.

2. Description of Related Art

A lithium ion secondary battery has such a feature that it has a higher energy density (a larger amount of work taken out of a charged battery per unit volume of the battery) than the conventional mainstream nickel-cadmium secondary battery and nickel-hydrogen secondary battery. In view of this, the development of lithium ion secondary batteries is in energetic progress in keeping with the recent needs of miniaturization and weight reduction of portable electronic equipment.

A lithium cobalt composite oxide represented by the formula: $LiCoO_2$ is now used as the cathode active material in a commercially available lithium ion secondary battery. $LiCoO_2$ is such an excellent active material that a secondary battery produced using the same has a large charge-and-discharge capacity and a stable charge-and-discharge cycle durability. However, cobalt as one starting material is small in the amount of mineral resources containing the same, and hence is expensive. In view of this, utilization of a lithium nickel composite oxide represented by the formula: $LiNiO_2$, and lithium manganese composite oxides having a spinel structure and represented by the formula: $LiMn_2O_4$ and the like as the cathode active material alternative to $LiCoO_2$ is under study. Among them, lithium manganese composite oxides are low in the price of starting materials and are least in the load on the environment. Thus, they are strongly desired to be put into practical use.

However, a secondary battery produced using a lithium manganese composite oxide as the cathode active material is insufficient in charge-and-discharge cycle durability. In other words, it involves a disadvantage that the capacity of the battery is deteriorated when it is repeatedly charged and discharged. This phenomenon is believed to occur due to the following properties of the lithium manganese composite oxide, for example, as mentioned in the report of Gummow et al. [see R. J. Gummow, A. deKock, and M. M. Thackeray, Solid State Ionics, Vol. 69, p.p. 59–67 (1994)].

The first property mentioned is that a disproportionation reaction of the following formula occurs particularly in a discharge state, with the result that $Mn^{2+}$ ions generated therefrom are dissolved out into an electrolytic solution. It is an irreversible reaction. Accordingly, as $Mn^{2+}$ ions are dissolved out into the electrolytic solution, crystals of the lithium manganese composite oxide are deteriorated.

$2Mn^{3+} \rightarrow Mn^{4+} + Mn^{2+}$

The second property mentioned is that a tetragonal strain, believed to be attributed to the Jahn-Teller effect, occurs in these crystals also in a discharge state. This also generally deteriorates the charge-and-discharge cycle durability of the secondary battery produced using the lithium manganese composite oxide.

The use of a spinel compound obtained by substituting part of manganese with other element(s) and represented by the formula: $Li_xM_yMn_{(2-y)}O_4$ (wherein M stands for a metal element such as Ti, Ge, Fe, Co, Cr, Zn, Ni, or Al; x is a number exceeding 0 but not more than 1; and y is a number exceeding 0 but not more than 1) has been proposed in order to attain improvements in respect of these demerits of the lithium manganese composite oxide to thereby improve the charge-and-discharge cycle durability of the secondary battery produced using the same [e.g., see J. M. Tarascon, D. Guyomard, Electrochem. Soc., Vol. 139, p. 937 (1991)]. It has become apparent that the substitution of manganese with cobalt in particular among these metals is effective in suppressing deterioration of crystals of the lithium manganese composite oxide. In fact, secondary batteries produced using as the respective cathode active materials composite oxides respectively obtained by substituting part of manganese with these metal elements, including cobalt, were all found to be improved in charge-and-discharge cycle durability (in comparison with the initial secondary battery based on the lithium manganese composite oxide). In such batteries, however, a large decrease in initial charge-and-discharge capacity was observed [e.g., see Ri et al., page 181 of Preprints of 36th Denchi Toron-kai (36th Symposium on Batteries) held under the auspices of Denchi Gijutu Iinkai (Battery Technology Committee) of The Electrochemical Society of Japan (Sep. 12 to 14, 1995 in Kyoto).

DISCLOSURE OF THE INVENTION

SUMMARY OF THE INVENTION

As described above, the charge-and-discharge cycle durability of the secondary battery produced using $LiMn_2O_4$ can be improved according to the proposed conventional method. For example, when part of Mn in $LiMn_2O_4$ is substituted with a different metal element according to a method of homogeneously adding the different metal element to $LiMn_2O_4$, a secondary battery produced using a composite oxide prepared by that method has an improved charge-and-discharge cycle durability. In this case, however, the problem with the decrease in the charge-and-discharge capacity of the battery, ensuing from the addition of the different metal element, cannot be solved.

The present invention is intended to provide a method for attaining an improvement in respect of the problem with the cathode active material for use in the conventional nonaqueous electrolyte secondary battery.

As a result of intensive investigations, the inventor of the present invention has found out that the existence of a nonmanganese metal element such as cobalt particularly near the surfaces of fine particles of the lithium manganese composite oxide can attain an improvement in respect of the foregoing problem with the charge-and-discharge cycle durability in a secondary battery produced using such fine particles of the composite oxide as the cathode active material without suffering a large decrease in the charge-and-discharge capacity thereof. The present invention has been completed based on this finding. Thus, the present invention solves the problem of the prior art by suppressing the deterioration of particularly surface portions of fine particles of the lithium manganese composite oxide.

Specifically, the first aspect of the present invention relates to a powdery cathode active material comprising as the active ingredient a lithium manganese composite oxide and at least one nonmanganese metal element selected from the group consisting of aluminum, magnesium, vanadium, chromium, iron, cobalt, nickel, and zinc, characterized in that the nonmanganese metal element exists in the surface portions of at least part of fine particles constituting the powdery cathode active material.

The surface portions of at least part of fine particles constituting the powdery cathode active material, i.e., portions where the nonmanganese metal element exists, preferably have a structure represented by the formula: $Li_xM_yMn_{(2-y)}O_4$ (wherein M stands for Al, Mg, V, Cr, Fe, Co, Ni, or Zn; x is a number exceeding 0 but not more than 1; and y is a number exceeding 0 but not more than 1).

Further, the second aspect of the present invention relates to a powdery cathode active material comprising as the active ingredient a lithium manganese composite oxide and at least one nonmanganese metal element selected from the group consisting of aluminum, magnesium, vanadium, chromium, iron, cobalt, nickel, and zinc, characterized in that the powdery cathode active material is prepared through the step of applying at least one member selected from the group consisting of oxides, oxyhydroxides and hydroxides of the above-mentioned nonmangenese metal elements on the surface of a powder of at least one member selected from the group consisting of manganese oxides, manganese oxyhydroxides, and manganese hydroxides, the step of mixing the resulting powder comprising at least one member selected from the group consisting of manganese oxides, manganese oxyhydroxides, and manganese hydroxides, and at least one member selected from the group consisting of oxides, oxyhydroxides and hydroxides of the above-mentioned nonmangenese metal elements with lithium hydroxide or a salt containing lithium to prepare a mixture, and the step of maintaining the mixture at a temperature of 300 to 1,000° C.

Further, the third aspect of the present invention relates to a nonaqueous electrolyte secondary battery comprising any one of the powdery cathode active materials as mentioned above, an anode active material, and a nonaqueous electrolytic solution containing a lithium salt.

Besides, the fourth aspect of the present invention relates to a process for preparing a cathode active material for use in a nonaqueous electrolyte secondary battery, comprising the step 1 of suspending a powder comprising as the main component at least one member selected from the group consisting of manganese oxides, manganese oxyhydroxides and manganese hydroxides in an aqueous solution containing a water-soluble salt of at least one nonmanganese metal element selected from the group consisting of aluminum, magnesium, vanadium, chromium, iron, cobalt, nickel and zinc to prepare a suspension, the step 2 of adding a base to the suspension to neutralize the suspension, the step 3 of mixing lithium hydroxide or a salt containing lithium with a powder prepared through the steps 1 and 2 and comprising as the main components at least one member selected from the group consisting of manganese oxides, manganese oxyhydroxides and manganese hydroxides, and at least one member selected from the group consisting of oxides, oxyhydroxides and hydroxides of at least one nonmanganese metal element selected from the group consisting of aluminum, magnesium, vanadium, chromium, iron, cobalt, nickel and zinc to prepare a mixture, and the step 4 of maintaining the mixture at a temperature of 300 to 1,000° C.

The nonaqueous electrolyte secondary battery in accordance with the third aspect of the present invention encompasses a secondary battery comprising at least a cathode active material, an anode active material and a nonaqueous electrolytic solution containing a lithium salt, and characterized in that the cathode active material contains particles of a powder comprising a lithium manganese composite oxide as the active ingredient, provided that the whole or part of the particles of the powder are particles having a nonmanganese metal element applied on the surfaces thereof in the course of preparation of the particles.

The process for preparing a cathode active material for use in a nonaqueous electrolyte secondary battery in accordance with the fourth aspect of the present invention encompasses a process for preparing a cathode active material for use in a nonaqueous electrolyte secondary battery, comprising suspending a powder comprising as the main component a manganese oxide and/or a manganese (oxy)hydroxide in an aqueous solution containing a cobalt salt, interacting an alkali therewith to apply cobalt oxide and/or cobalt (oxy) hydroxide on the surfaces of the particles of the powder, mixing the resulting powder with lithium hydroxide or a salt containing lithium, and maintaining the resulting mixture at a temperature of 300 to 1,000° C.

The present invention will now be described in detail.

DETAILED DESCRIPTION OF THE INVENTION

The cathode active material of the present invention has a powdery form, i.e., a powder. The diameter of the fine particles constituting the powder can be selected from a wide range of 0.02 to 40 μm, though it is preferably 0.1 to 40 μm from the viewpoint of the ease of preparation of the powder and application thereof to a battery system.

In this specification, the term "fine particles" does not mean a spherical form, but indicates respective small particles constituting the powder. Accordingly, the concept of "fine particles" encompasses not only spherical particles, but also, for example, those in a needle-like, rice grain-like, fibrous, or like form.

Fine particles constituting the powdery cathode active material of the present invention contain a lithium manganese composite oxide as the active ingredient, provided that at least part of the fine particles further contain a specific nonmanganese metal element in the surface portions thereof.

The nonmanganese metal element to be used in the present invention is at least one member selected from the group consisting of aluminum, magnesium, vanadium, chromium, iron, cobalt, nickel and zinc, among which chromium, aluminum, cobalt and nickel are suitable, among which cobalt and nickel are further suitable, between which cobalt is most suitable. Among these nonmanganese metal elements, chromium, iron, cobalt and nickel constitute one group.

In the present invention, examples of the "fine particles having a specific nonmanganese metal element present in the surface portions thereof" include fine lithium manganese composite oxide particles, on the surfaces of which a lithium manganese composite oxide containing the above-mentioned specific nonmanganese metal element (i.e., a nonmanganese metal element/lithium/manganese composite oxide) is applied, and fine lithium manganese composite oxide particles containing the above-mentioned specific nonmanganese metal element with a concentration gradient ranging from a high concentration in their surface portions to a low concentration (preferably zero) in their core portions. The concentration gradient may be any of continuous and discontinuous ones.

The latter example will be described in further detail. Specifically, fine particles of the latter example have such a configuration that the specific nonmanganese metal element is diffused from the surfaces of the fine particles toward the insides thereof. Accordingly, that configuration is distinguished from a so-called doped structure wherein the nonmanganese metal element is homogeneously contained in the lithium manganese composite oxide. A specific description will be made taking as an example a case where cobalt is used as the specific nonmanganese metal element. In the case of such fine particles, the surface portions of the fine particles contain cobalt in a relatively higher concentration than the inner portions of the fine particles, the inner portions either consisting of the initial lithium manganese composite oxide free of cobalt or containing cobalt in a relatively lower concentration than the surface portions of the fine particles.

The powdery cathode active material in accordance with another embodiment of the present invention, which comprises a lithium manganese composite oxide as the active ingredient and the above-mentioned specific nonmanganese metal element, is characterized in that it is prepared through the step of applying at least one member selected from the group consisting of oxides, oxyhydroxides and hydroxides of the above-mentioned specific nonmanganese metal elements on the surface of a powder of at least one member selected from the group consisting of manganese oxides, manganese oxyhydroxides, and manganese hydroxides, the step of mixing the resulting powder with lithium hydroxide or a salt containing lithium to prepare a mixture, and the step of maintaining the mixture at a temperature of 300 to 1,000° C. This process will be described later in detail.

Examples of the manganese oxides include $MnO$, $Mn_3O_4$, $Mn_2O_3$, $MnO_2$, and $Mn_2O_7$. Examples of the manganese oxyhydroxides include $MnO(OH)$, and $MnO(OH)_2$. Examples of the manganese hydroxides include $Mn(OH)_2$.

Examples of the powder of at least one member selected from the group consisting of manganese oxides, manganese oxyhydroxides and manganese hydroxides which may be used include powders of such compounds wherein part of manganese is substituted with other element(s) (e.g., calcium, magnesium, aluminum, titanium, zinc, chromium, cobalt, nickel or iron).

The term "applying" as used herein is intended to indicate a concept encompassing not only depositing but also providing a state wherein a nonmanganese metal element is contained with a concentration gradient ranging from a high concentration in an outer portion (near the surface) to a low concentration in an inner portion (the gradient may be any of continuous and discontinuous) as described hereinabove.

In the powdery cathode active material of the present invention, lithium manganese composite oxide portions preferably have a spinel structure represented by the formula: $Li_xMn_2O_4$ (wherein x is a numerical value exceeding 0 but not more than 1). The surface portions of at least part of fine particles constituting the powdery cathode active material of the present invention, i.e., portions where a nonmanganese metal element exists, preferably has a structure represented by the formula: $Li_xM_yMn_{(2-y)}O_4$ (wherein M stands for Al, Mg, V, Cr, Fe, Co, Ni or Zn; x is a number exceeding 0 but not more than 1; and y is a number exceeding 0 but not more than 1).

A description will now be made of the process of the present invention for preparing a powdery cathode active material for use in a nonaqueous electrolyte secondary battery. Although the following description will be made of a case of using cobalt as the nonmanganese metal element, the use of any one of the above-mentioned nonmanganese metal elements can exert the same effects.

An example of the process of the present invention for preparing a cathode active material is as follows. Specifically, a powder comprising as the main component at least one member selected from the group consisting of manganese oxides, manganese oxyhydroxides and manganese hydroxides is suspended in an aqueous solution containing a water-soluble cobalt salt to prepare a suspension (step 1). Subsequently, a base (alkali) is added to the suspension preferably while blowing air or oxygen into the suspension to neutralize the suspension (step 2). Through this neutralizing operation, at least one member selected from the group consisting of oxides, oxyhydroxides and hydroxides of cobalt is applied on the surface of the powder comprising as the main component at least one member selected from the group consisting of manganese oxides, manganese oxyhydroxides and manganese hydroxides. In other words, layers of at least one member selected from the group consisting of oxides, oxyhydroxides and hydroxides of cobalt are deposited. The resulting powder is washed with water, dried, and then mixed with lithium hydroxide or a salt containing lithium to prepare a mixture (step 3). This mixture is maintained in an air or oxygen atmosphere at a temperature of 300 to 1,000° C., preferably 400 to 900° C., preferably for 3 to 100 hours (step 4). Thus, there can be obtained a cathode active material according to the present invention.

The aqueous solution containing a water-soluble cobalt salt may be an aqueous solution of a water-soluble cobalt salt, though it is preferably an aqueous solution containing a water-soluble cobalt salt and a water-soluble manganese salt. The use of the latter forms layers of oxides, oxyhydroxides or hydroxides of cobalt and manganese.

Examples of the water-soluble cobalt salt include cobalt chloride, cobalt nitrate, and cobalt sulfate. Examples of the water-soluble manganese salt include manganese chloride, manganese nitrate, and manganese sulfate.

The base to be used for neutralization is a substance capable of forming hydroxide ions through dissociation in the aqueous solution and forming a salt through neutralization therewith of an acid. Specific examples of the base include sodium hydroxide, ammonia, and potassium hydroxide. The base may used as such, though it is preferably used in the form of an aqueous solution thereof having a suitable concentration from the viewpoint of workability.

Examples of the salt containing lithium include lithium hydroxide, lithium nitrate, and lithium carbonate.

The mixture of the powder comprising at least one member selected from the group consisting of manganese oxides, manganese oxyhydroxides and manganese hydroxides and containing especially cobalt in the surface portions thereof with lithium hydroxide or a salt containing lithium is maintained at a temperature of 300 to 1,000° C. to form a cobalt lithium manganese composite oxide, provided that the cobalt lithium manganese composite oxide mainly constitutes the surface portions thereof with the core portions constituted of the lithium manganese composite oxide. When the temperature is lower than 300° C. in this step, the progress of the reaction is slow. On the other hand, when the temperature exceeds 1,000° C. in this step, cobalt is diffused into the core portions of the fine particles due to melting of the fine particles of the powder containing cobalt or acceleration of diffusion of cobalt.

Another example of the process of the present invention for preparing a powdery cathode active material is as follows. Specifically, a manganese oxide or a manganese salt such as manganese carbonate or manganese nitrate is mixed with a lithium salt such as lithium hydroxide and lithium nitrate to prepare a mixture. Subsequently, the mixture is heated to obtain a lithium manganese composite oxide. This lithium manganese composite oxide is preferably one having a spinel structure as described hereinabove. Cobalt is added to the lithium manganese composite oxide thus prepared.

Cobalt is added, for example, in the following manner. Specifically, the lithium manganese composite oxide is suspended in an aqueous solution containing a water-soluble cobalt salt and optionally a water-soluble manganese salt. Lithium hydroxide (base) is added to the resulting suspension to neutralize the suspension. Solid matter in the suspension is washed with water, and then dried. The resulting powder is mixed with lithium hydroxide or a lithium salt. The resulting mixture is heated at a temperature of 300 to 1,000° C. Thus, cobalt can be added to the vicinities of the surfaces of the lithium manganese composite oxide. The aqueous solution in which the lithium manganese composite oxide is to be suspended is preferably one containing both a water-soluble cobalt salt and a water-soluble manganese salt.

The same cathode active material as described above can alternatively be obtained by adding lithium hydroxide to the above-mentioned suspension, evaporating water from the resulting suspension, for example, with a rotary evaporator, and heating the evaporation residue at a temperature of 300 to 1,000° C.

Particularly when cobalt alone is added to the lithium manganese composite oxide (i.e., when use is made of an aqueous solution containing a water-soluble cobalt salt but not containing a water-soluble manganese salt), firing may as well be done for a long period of time or at a comparatively higher temperature. The diffusion of cobalt is effected through this firing. For example, when the firing time is too short in this step, lithium cobalt oxide layers differing in oxidation-reduction properties from the lithium manganese composite oxide are formed on the surfaces of fine particles, thus causing the deterioration of the performance of a battery.

In the process of the present invention for preparing a powdery cathode active material, the nonmanganese metal element is preferably used in an amount of 0.1 to 20 mol % based on manganese. The concentration of a water-soluble salt of the nonmanganese metal element in the water phase of the suspension is preferably such that the concentration of that element is 0.05 to 5 wt. %. On the other hand, when use is made of an aqueous solution containing a water-soluble manganese salt, the water-soluble manganese salt concentration of the water phase of the suspension is preferably such that the manganese concentration is 0.05 to 5 wt. %. The powder to be suspended is preferably used in an amount of 2 to 40 wt. % based on the aqueous solution containing a water-soluble nonmanganese metal element salt and optionally a water-soluble manganese salt. The lithium/manganese proportion may as well be such a proportion as to form a spinel compound oxide.

The nonaqueous electrolyte secondary battery of the present invention comprises any one of the foregoing cathode active materials according to the present invention, an anode active material, and a nonaqueous electrolytic solution containing a lithium salt.

In the battery of the present invention, the cathode is usually constituted of a cathode active material, a conductive material and a bonding agent for fixing them on a substrate. Examples of the conductive material include carbon black, natural and artificial graphites, carbon fibers, and metal powders such as an aluminum powder and a stainless steel powder. Examples of the bonding agent include polyvinylidene fluoride, a tetrafluoroethylene resin (e.g., one commercially available under the trade name of Teflon), and synthetic rubbers such as a styrene-butadiene rubber and an isoprene rubber.

The anode is usually constituted of an anode active material and a bonding agent. Examples of the anode active material include natural and artificial graphites, low-crystallinity carbon, tin oxide, and metallic lithium. On the other hand, examples of the bonding agent include those mentioned as the examples of the bonding agent constituting the cathode.

In the nonaqueous electrolyte secondary battery of the present invention, the electrolyte is a lithium salt. Examples of the lithium salt usable in the present invention include $LiClO_4$, $LiBF_4$, $LiAsF_6$, and $LiPF_6$. Meanwhile, examples of the nonaqueous material for dissolving the electrolyte include ethylene carbonate, propylene carbonate, methyl ethyl carbonate, dimethyl carbonate, 1,3-dioxolane, N-methyloxazolidinone, and γ-butyllactone.

The powdery cathode active material of the present invention comprises as the active ingredient a lithium manganese composite oxide and a specific nonmanganese metal element such as cobalt. The fine particles consisting the powder is conducted that the nonmanganese metal element is contained more in the surface portions of the fine particles of the powder than in the inner portions thereof to suppress deterioration of the electrode performance, which is liable to occur particularly near the surfaces of the fine particles particularly when depth discharge is attained.

Conventional cathode active materials comprising as the active ingredient a lithium manganese composite oxide and further cobalt are decreased in the charge-and-discharge capacity of a battery produced using the same as compared with cathode active materials not containing cobalt. By contrast, the powdery cathode active material of the present invention has a specific nonmanganese metal element such as cobalt either contained only at a low proportion or not substantially contained (i.e., initial lithium manganese composite oxide) in the inner portions of the fine particles thereof. Accordingly, no loss of charge-and-discharge capacity ensues from the addition of a specific nonmanganese metal element such as cobalt in the inner portions of the fine particles.

On the other hand, it has hitherto been known that the addition of cobalt to a cathode active material is effective in improving the charge-and-discharge durability. The amount of the specific nonmanganese metal element, such as cobalt, required for securing such an effect can be controlled to a small amount in the present invention as compared with conventional cases where a metal element such as cobalt is homogeneously added to the whole bodies of the fine particles of a lithium manganese composite oxide. In order to homogeneously add cobalt to the whole bodies of the fine particles to form a doped structure, it has been believed suitable that the amount of cobalt is about 10 to 20 mol % based on the amount of manganese. According to the present invention, however, there is a case where the effect of improving the charge-and-discharge cycle durability can be secured even when the amount of the cobalt added is smaller than the above shown range.

EXAMPLES

The following specific Examples will illustrate the present invention in detail. Needless to say, however, these Examples should not be construed as limiting the scope of the present invention.

The term "parts" in the following Examples represents "parts by weight."

Example 1

44 parts of acicular manganese oxyhydroxide (MnOOH), being 1 to 2 μm in the longitudinal axis and 0.1 to 0.3 μm in the diameter, (Chuo Denki Kogyo Co., Ltd.) was suspended in 1,000 parts of an aqueous solution containing 6 parts of cobalt chloride hexahydrate and 5 parts of manganese chloride tetrahydrate. An aqueous solution of sodium hydroxide (concentration: 4 wt. %) was dropwise added to the resulting suspension while blowing air thereinto to neutralize it. The neutralized suspension was stirred for 2 hours. Thereafter, the suspension was filtered to recover solid matter. The solid matter was washed with ion-exchanged water and then dried in an oven at 150° C. to obtain a powder.

8.0 parts of the resulting powder [Mn:Co=20:1 (molar ratio)] was mixed with 1.95 parts of lithium hydroxide monohydrate. The resulting mixture was formed into tablets with a molding tool and maintained at 600° C. for 72 hours to obtain a cathode active material comprising a lithium manganese spinel composite oxide as the main component.

15 parts of the cathode active material was mixed with 1 part of graphite, 1 part of acetylene black, 1.5 parts of polyvinylidene fluoride and 35 parts of N-methylpyrrolidone, followed by mutual dispersion with a homomixer. The resulting mixture was applied on an aluminum foil and then dried to form a coating film.

The obtained coating film was cut into a round piece of 18 mm in diameter (weight of the active material: about 20 mg) to form a cathode.

(Evaluation of characteristics)

The cathode thus formed was used together with a lithium counter electrode to determine the charge-and-discharge characteristics. Specifically, charge and discharge were repeated at a voltage of 3.3 to 4.3 V and at a constant electric current of 0.5 mA to measure the electrical quantities of charge and discharge.

A porous polyethylene membrane was used as a separator between the electrodes, a liquid mixture of dimethyl carbonate and ethylene carbonate [1/1 (weight ratio)] as a liquid for preparing an electrolytic solution, and $LiPF_6$ (1 mol/l) as an electrolyte.

Example 2

Commercially available manganese dioxide was heat-treated at a temperature of 600° C. for 5 hours. 30 parts of the manganese oxide thus prepared was suspended in 500 parts of an aqueous solution containing 6 parts of cobalt chloride hexahydrate. An aqueous solution of sodium hydroxide (concentration: 4 wt. %) was dropwise added to the resulting suspension under stirring while blowing air thereinto to neutralize it. The neutralized suspension was stirred for 2 hours. Thereafter, the suspension was filtered to recover solid matter. The solid matter was washed with ion-exchanged water and then dried in an oven at 150° C. to obtain a powder.

8.0 g of the obtained powder [Mn:Co=10:0.7 (molar ratio)] was mixed with 2.0 parts of lithium hydroxide monohydrate. The resulting mixture was formed in the same manner as in Example 1, and then heat-treated to obtain a cathode active material comprising a lithium manganese composite oxide of 5 μm in particle size as the main component.

The obtained cathode active material was used to form a cathode in the same manner as in Example 1.

The cathode was used to evaluate the characteristics in the same manner as in Example 1.

Example 3

Commercially available manganese carbonate was heat-treated at a temperature of 600° C. for 5 hours. The manganese oxide (particle size: about 5 μm) thus prepared was treated in the same manner as in Example 2 to obtain a powder [Mn:Co=10:0.7 (molar ratio)].

8.0 g of the obtained powder was mixed with 2.0 parts of lithium hydroxide monohydrate. The resulting mixture was heat-treated in the same manner as in Example 1 to obtain a cathode active material comprising a lithium manganese composite oxide as the main component.

The obtained cathode active material was used to form a cathode in the same manner as in Example 1.

The cathode was used to evaluate the characteristics in the same manner as in Example 1.

Comparative Example 1

8 parts of the same acicular manganese oxyhydroxide as used in Example 1 was mixed with 2 parts of lithium hydroxide monohydrate. The resulting mixture was formed into tablets with a molding tool and maintained at 600° C. for 72 hours to obtain a cathode active material comprising a lithium manganese composite oxide as the main component.

The obtained cathode active material was used to form a cathode in the same manner as in Example 1.

The cathode was used to evaluate the characteristics in the same manner as in Example 1.

Comparative Example 2

7.56 parts of manganese dioxide was mixed with 1.9 parts of lithium hydroxide monohydrate. The resulting mixture was formed into tablets with a molding tool and maintained at 600° C. for 72 hours to obtain a cathode active material comprising a lithium manganese composite oxide as the main component.

The obtained cathode active material was used to form a cathode in the same manner as in Example 1.

The cathode was used to evaluate the characteristics in the same manner as in Example 1.

Comparative Example 3

7.56 parts of manganese dioxide was mixed with 1.14 parts of cobalt carbonate and 2.2 parts of lithium hydroxide monohydrate. The resulting mixture was formed into tablets with a molding tool and maintained at 800° C. for 72 hours to obtain a cathode active material comprising a lithium manganese composite oxide as the main component. In this cathode active material, the cobalt element is not maldistributed in the surface portions of fine particles constituting the cathode active material but homogeneously exists across the whole bodies of fine particles.

The obtained cathode active material was used to form a cathode in the same manner as in Example 1.

The cathode was used to evaluate the characteristics in the same manner as in Example 1.

Comparative Example 4

10 parts of manganese carbonate was mixed with 1.14 parts of cobalt carbonate and 2 parts of lithium hydroxide monohydrate. The resulting mixture was maintained at 800° C. for 72 hours to obtain a cathode active material comprising a lithium manganese composite oxide as the main component. In this cathode active material, the cobalt element is not maldistributed in the surface portions of fine particles constituting the cathode active material but homogeneously exists across the whole bodies of fine particles.

The obtained cathode active material was used to form a cathode in the same manner as in Example 1.

The cathode was used to evaluate the characteristics in the same manner as in Example 1.

The results of evaluation of the characterstics made in the foregoing Examples and Comparative Examples are shown in Table 1.

As is apparent from the results, the use of the cathode active material of the present invention provides a superior charge-and-discharge cycle durability and a substantially equivalent initial charge-and-discharge capacity to the use of any one of conventional cathode active materials comprising a lithium manganese composite oxide as the main component (Comparative Examples 1 and 2). On the other hand, the use of the cathode active material comprising a lithium manganese composite oxide containing the cobalt element homogeneously present thereacross (Comparative Examples 3 and 4) suffers a notable decrease in the initial charge-and-discharge capacity as compared with Comparative Examples 1 and 2.

TABLE 1

| | Initial charge/discharge capacity per unit weight (100 for lithium manganese composite oxide of Comp. Ex. 2) | Capacity Retention | |
|---|---|---|---|
| | | 20 cycles | 50 cycles |
| Ex. 1 | 92 | 0.97 | 0.97 |
| Ex. 2 | 92 | 0.96 | 0.94 |
| Ex. 3 | 92 | 0.96 | 0.94 |
| Comp. Ex. 1 | 100 | 0.80 | 0.73 |
| Comp. Ex. 2 | 100 | 0.76 | 0.69 |
| Comp. Ex. 3 | 85 | 0.94 | 0.92 |
| Comp. Ex. 4 | 85 | 0.94 | 0.92 |

What is claimed is:

1. A cathode active material consisting of
   a lithium manganese composite oxide and
   at least one nonmanganese metal element selected from the group consisting of aluminum, magnesium, vanadium, chromium, iron, cobalt, nickel, and zinc, wherein
      the cathode active material consists of a powder consisting of particles;
      the particles include at least one particle comprising a surface portion; and
      the surface portion of the at least one particle has a surface concentration of the at least one nonmanganese metal element that is greater than an interior concentration of the at least one nonmanganese metal element at an interior of the at least one particle.

2. The cathode active material according to claim 1, wherein a portion of the at least one nonmaganese metal element exists in a form represented by $Li_xM_yMn_{(2-y)}O_4$, where M is selected from the group consisting of Al, Mg, V, Cr, Fe, Co, Ni, and Zn; x is a number exceeding 0 but not more than 1; and y is a number exceeding 0 but not more that 1.

3. The cathode active material according to claim 1, wherein the cathode active material is prepared by a process comprising
   applying at least one member selected from the group consisting of oxides, oxyhydroxides and hydroxides of the at least one nonmaganese metal element on a surface of a powder of at least one member selected from the group consisting of manganese oxides, manganese oxyhydroxides, and manganese hydroxides to form a coated powder;
   mixing the coated powder with lithium hydroxide or a salt containing lithium to prepare a mixture; and
   maintaining the mixture at a temperature of 300 to 1,000° C.

4. A nonaqueous electrolyte secondary battery comprising
   the cathode active material of claim 1,
   an anode active material, and
   a nonaqueous electrolytic solution containing a lithium salt.

5. A nonaqueous electrolyte secondary battery comprising
   the cathode active material of claim 3,
   an anode active material, and
   a nonaqueous electrolytic solution containing a lithium salt.

6. A process for preparing a cathode active material, the process comprising
   suspending a powder comprising at least one member selected from the group consisting of manganese oxides, manganese oxyhydroxides and manganese hydroxides in an aqueous solution containing a water-soluble salt of at least one member selected from the group consisting of oxides, oxyhydroxides and hydroxides of at least one nonmanganese metal element selected from the group consisting of aluminum, magnesium, vanadium, chromium, iron, cobalt, nickel and zinc to prepare a suspension;
   adding a base to the suspension to neutralize the suspension and form a coated powder;
   mixing the coated powder with lithium hydroxide or a salt containing lithium to prepare a mixture; and
   maintaining the mixture at a temperature of 300 to 1,000° C.

7. A method of making a cathode active material, the method comprising
   applying at least one member selected from the group consisting of oxides, oxyhydroxides and hydroxides of at least one nonmaganese metal element on a surface of a powder of at least one member selected from the group consisting of manganese oxides, manganese oxyhydroxides, and manganese hydroxides; and
   forming the cathode active material of claim 1.

8. A method of using a cathode active material, the method comprising charging or discharging a battery comprising the cathode active material of claim 1.

9. A cathode active material consisting of
   particles comprising a lithium manganese composite oxide, and
   a deposit on surface portions of at least part of the particles, wherein
      the deposit comprises $Li_xM_yMn_{(2-y)}O_4$, where M is selected from the group consisting of Al, Mg, V, Cr, Fe, Co, Ni, and Zn, x is a number exceeding 0 but not more than 1, and y is a number exceeding 0 but not more that 1.

10. A nonaqueous electrolyte secondary battery comprising the cathode active material of claim 9, an anode active material, and a nonaqueous electrolytic solution containing a lithium salt.

11. A method of making a cathode active material, the method comprising applying at least one member selected from the group consisting of oxides, oxyhydroxides and hydroxides of at least one nonmaganese metal element on a surface of a powder of at least one member selected from the group consisting of manganese oxides, manganese oxyhydroxides, and manganese hydroxides; and forming the cathode active material of claim 9.

12. A method of using a cathode active material, the method comprising charging or discharging a battery comprising the cathode active material of claim 9.

* * * * *